(12) United States Patent
Kozlowski et al.

(10) Patent No.: US 8,801,266 B2
(45) Date of Patent: Aug. 12, 2014

(54) AGITATOR RELEASE FOR A FOOD MIXER

(75) Inventors: Eugene J. Kozlowski, Medina, OH (US); David J. Kolar, Stow, OH (US); Glenn F. Brasdovich, Olmsted Township, OH (US); Kenneth W. Bair, Akron, OH (US); Richard D. Boozer, Wakeman, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 963 days.

(21) Appl. No.: 12/924,360

(22) Filed: Sep. 24, 2010

(65) Prior Publication Data

US 2011/0216624 A1    Sep. 8, 2011

Related U.S. Application Data

(63) Continuation-in-part of application No. 12/660,707, filed on Mar. 4, 2010.

(51) Int. Cl.
*B01F 7/00*    (2006.01)

(52) U.S. Cl.
USPC ........... 366/279; 366/331; 366/343; 366/297; 366/241

(58) Field of Classification Search
USPC .................. 366/129, 343, 279, 297, 214, 331
See application file for complete search history.

(56) References Cited

U.S. PATENT DOCUMENTS

| | | | |
|---|---|---|---|
| 2,111,407 A | 3/1938 | Rommel | |
| 2,138,253 A * | 11/1938 | Lynch | 279/29 |
| D177,994 S | 6/1956 | Lind | D54/12 |
| 2,833,576 A * | 5/1958 | Cirone | 403/334 |
| D194,984 S | 4/1963 | Grise et al. | D44/1 |
| 3,910,590 A * | 10/1975 | Ekstrom | 279/19.1 |
| 4,132,489 A * | 1/1979 | Berg et al. | 403/305 |
| 4,159,182 A * | 6/1979 | Adolfson | 366/343 |
| 4,207,673 A | 6/1980 | DiGirolamo et al. | 30/142 |
| D309,399 S * | 7/1990 | Barnard et al. | D7/412 |

(Continued)

FOREIGN PATENT DOCUMENTS

WO    WO 88/01199    2/1988

OTHER PUBLICATIONS

International Search Report of PCT/US2011/000311 (dated May 23, 2011—2 pages).

(Continued)

*Primary Examiner* — Tony G Soohoo
(74) *Attorney, Agent, or Firm* — Renner, Kenner, Greive, Bobak, Taylor & Weber (57) ABSTRACT

A machine (10) for mixing food products includes a motor (22) which turns a hollow shaft assembly (28) that carries an agitator (40). The agitator (40) has an I-beam shaped stem (41) with a blade (43) in the shape of the bowl of a spoon on one end of the stem (41). A socket (44) is formed at the other end of the stem (41) and has a bottom surface (45). An assembly (70) for releasing the agitator (40) from the shaft assembly (28) includes a solenoid (71) which pivots an arm (74) that engages a plunger (80). The plunger (80) includes a pin (81) which is received in the hollow shaft assembly (28) and which engages the bottom surface (45) of the socket (44) of the agitator (40) upon activation of the solenoid (71) to release the agitator (40) from the hollow shaft assembly (28).

18 Claims, 7 Drawing Sheets

(56) References Cited

U.S. PATENT DOCUMENTS

| | | | |
|---|---|---|---|
| 4,946,287 A * | 8/1990 | Barnard et al. | 366/343 |
| 5,112,135 A * | 5/1992 | Rupp | 366/197 |
| 5,803,598 A | 9/1998 | Harry et al. | |
| D424,874 S * | 5/2000 | Anton et al. | D7/412 |
| D426,108 S * | 6/2000 | Anton et al. | D7/412 |
| 6,789,933 B2 * | 9/2004 | Gili et al. | 366/129 |
| 8,251,572 B2 * | 8/2012 | Kozlowski | 366/197 |
| 8,414,183 B2 * | 4/2013 | Kozlowski et al. | 366/343 |
| 8,430,557 B2 * | 4/2013 | Boozer et al. | 366/197 |
| 2008/0159070 A1 * | 7/2008 | Cocchi et al. | 366/343 |
| 2008/0223225 A1 * | 9/2008 | Boozer et al. | 99/485 |
| 2011/0013477 A1 * | 1/2011 | Kozlowski et al. | 366/198 |
| 2011/0216623 A1 * | 9/2011 | Kozlowski et al. | 366/315 |
| 2011/0216624 A1 * | 9/2011 | Kozlowski et al. | 366/315 |
| 2011/0228632 A1 * | 9/2011 | Kozlowski et al. | 366/343 |
| 2012/0250453 A1 * | 10/2012 | Kozlowski et al. | 366/343 |
| 2013/0223183 A1 * | 8/2013 | Kozlowski et al. | 366/343 |

OTHER PUBLICATIONS

Drawings from U.S. Appl. No. 11/717,015, (filed Mar. 13, 2007—3 sheets).

* cited by examiner

FIG-7C

AGITATOR RELEASE FOR A FOOD MIXER

CROSS-REFERENCE TO RELATED APPLICATION

This application is a continuation-in-part of U.S. patent application Ser. No. 12/660,707 filed on Mar. 4, 2010.

TECHNICAL FIELD

This invention relates to a device which mixes food products, such as soft serve products, frozen drinks or the like, with a disposable agitator carried on a rotating shaft. More specifically, this invention relates to such a device which will automatically release the agitator from the shaft when the mixing is completed.

BACKGROUND ART

Food mixing machines are commonly utilized by fast food establishments or the like, particularly those that blend condiments or other foods into ice cream in a container for consumption by the customer with a spoon. The blending is typically performed by an agitator carried at the bottom of a rotating shaft. The ice cream and other foods to be blended are put into a container and the agitator is positioned in the ice cream to blend the product.

After use, the agitator must be cleaned to avoid contamination of the next product to be blended.

In order to avoid the step of cleaning the agitator, disposable agitators have been developed which are placed on the rotating shaft prior to use, and removed from the rotating shaft after use. As a result, the shaft does not need to be cleaned between each usage.

Some of those disposable agitators have been formed in the shape of a spoon. In those devices, the bowl of the spoon mixes the product and the handle of the spoon is hollow and is received over at least a portion of the rotatable shaft of the food mixer. The spoon shaft is provided with a clip which is snapped over a rib provided on the rotatable shaft to attach the spoon to the shaft. The product is then blended and the spoon removed from the shaft. This system is advantageous not only because of the saving of time by not having to clean the agitator after each use, but also the spoon can be given to the customer to consume the food thereby saving the establishment the cost of providing conventional spoons to the customer.

The fast food establishments are always striving to make these machines more automatic for the ease of operation by the user. Yet the user is still required to remove the disposable agitator from the rotating shaft which is not always a simple procedure. When the agitator is in the shape of a spoon, at least the customer is induced to remove it from the shaft, but no existing machine includes the feature of automatically releasing the disposable agitator from the shaft without the need for the customer to manually grasp and remove it.

Moreover, no agitator in the shape of a spoon has been designed to allow such an automatic release. Specifically, the hollow stems of the prior art spoons provide no surface to be acted upon for automatic ejection. In addition, these hollow stems present a structural weakness and a manufacturing problem in that an expensive, high maintenance mold, with a long pull to produce the hollow stems, is required.

Thus, the need exists for a machine which is produced with an automatic agitator release system, and for an agitator which is in the shape of a spoon which can be easily manufactured and which can compliment the agitator release system of the machine.

DISCLOSURE OF THE INVENTION

It is thus an object of one aspect of the present invention to provide a food mixing machine which will release a disposable agitator for a rotating shaft without manual engagement of the agitator by the user.

It is an object of another aspect of the present invention to provide a food mixing machine, as above, which will release the agitator automatically.

It is an additional object of the present invention to provide the food mixing machine, as above, with the agitator being in the shape of a spoon and complimenting the agitator release mechanism.

It is a further object of the present invention to provide a spoon agitator for the food mixing machine which is strong to withstand the vigors of agitation while being easy to manufacture.

These and other objects of the present invention, as well as the advantages thereof over existing prior art forms, which will become apparent from the description to follow, are accomplished by the improvements hereinafter described and claimed.

In general, a machine for mixing food products made in accordance with the present invention includes a rotatable shaft assembly and an agitator carried by the shaft assembly and adapted to mix the food products. Means are provided to release the agitator from the shaft assembly.

In accordance with another aspect of the present invention, an agitator for a food mixing machine includes a stem in the shape of an I-beam and a blade at one end of the stem. The blade is in the shape of the bowl of a spoon. A shaft coupler is on the other end of the stem and is adapted to receive the rotating shaft of the mixing machine.

An agitator for a food mixing machine made in accordance with another aspect of the invention includes a stem, and a blade in the shape of the bowl of a spoon is formed at one end of the stem. A socket is formed on the other end of the stem and is adapted to receive the rotating shaft of the mixing machine.

A machine for mixing food products made in accordance with the aspects of the present invention includes a rotatable shaft assembly and an agitator carried by the rotatable shaft assembly. The agitator includes a stem in the form of an I-beam, a blade in the shape of the bowl of a spoon at one end of the stem and adapted to mix the food products, and a socket at the other end of the stem adapted to receive the rotatable shaft assembly. Means are provided to release the agitator from the rotatable shaft assembly.

A preferred exemplary food mixing machine according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A food mixing machine having an agitator release feature made in accordance with the present invention is generally indicated by the numeral 10. Machine 10 is somewhat schematically shown and many of its details which do not relate to the agitator release feature are not shown. However, for the full understanding of a typical machine 10 and its operation, reference is made to pending U.S. patent application Ser. No. 12/460,273 filed Jul. 17, 2009, which is incorporated herein by reference.

Figure 1:
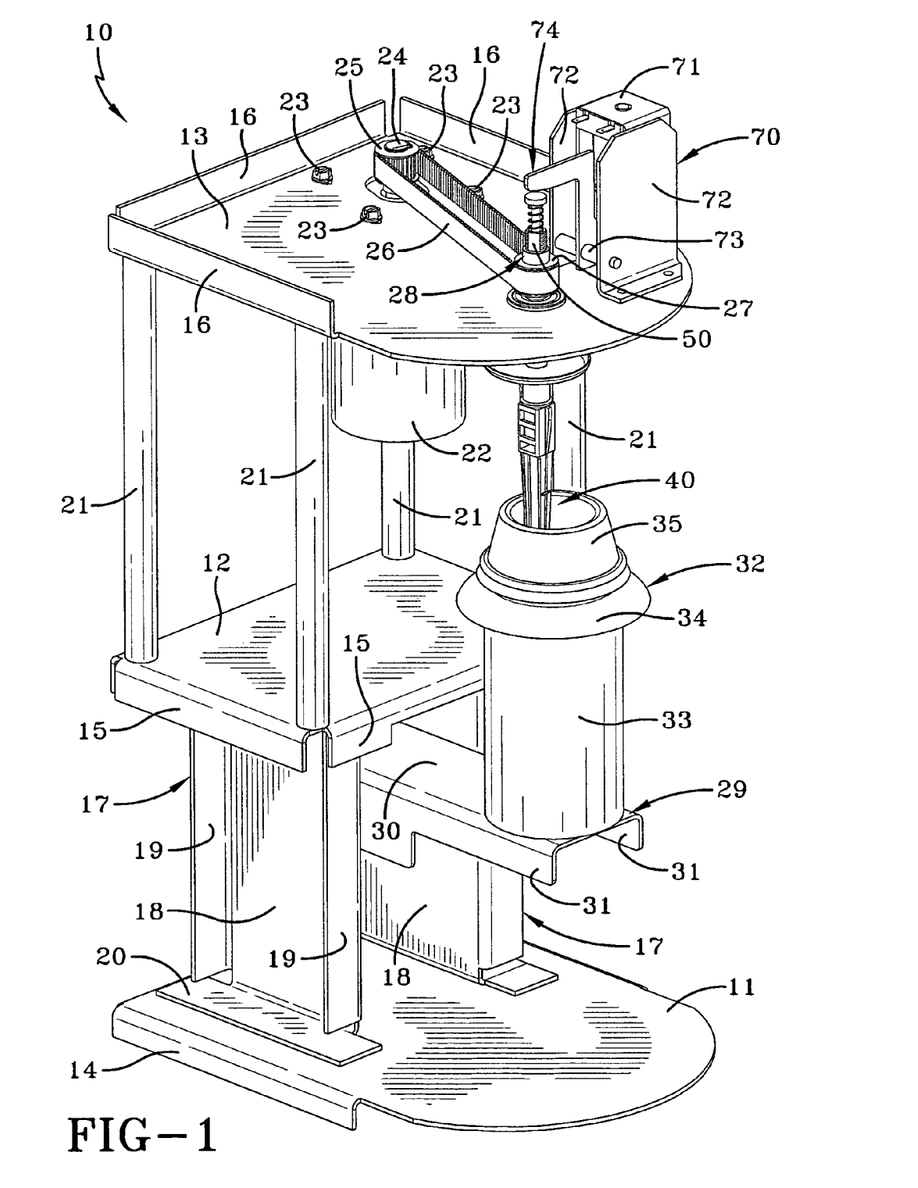
FIG. 1 is a somewhat schematic perspective view of a food mixing machine having the agitator release feature of the present invention and showing the agitator mixing food in a cup.
Figure 2:
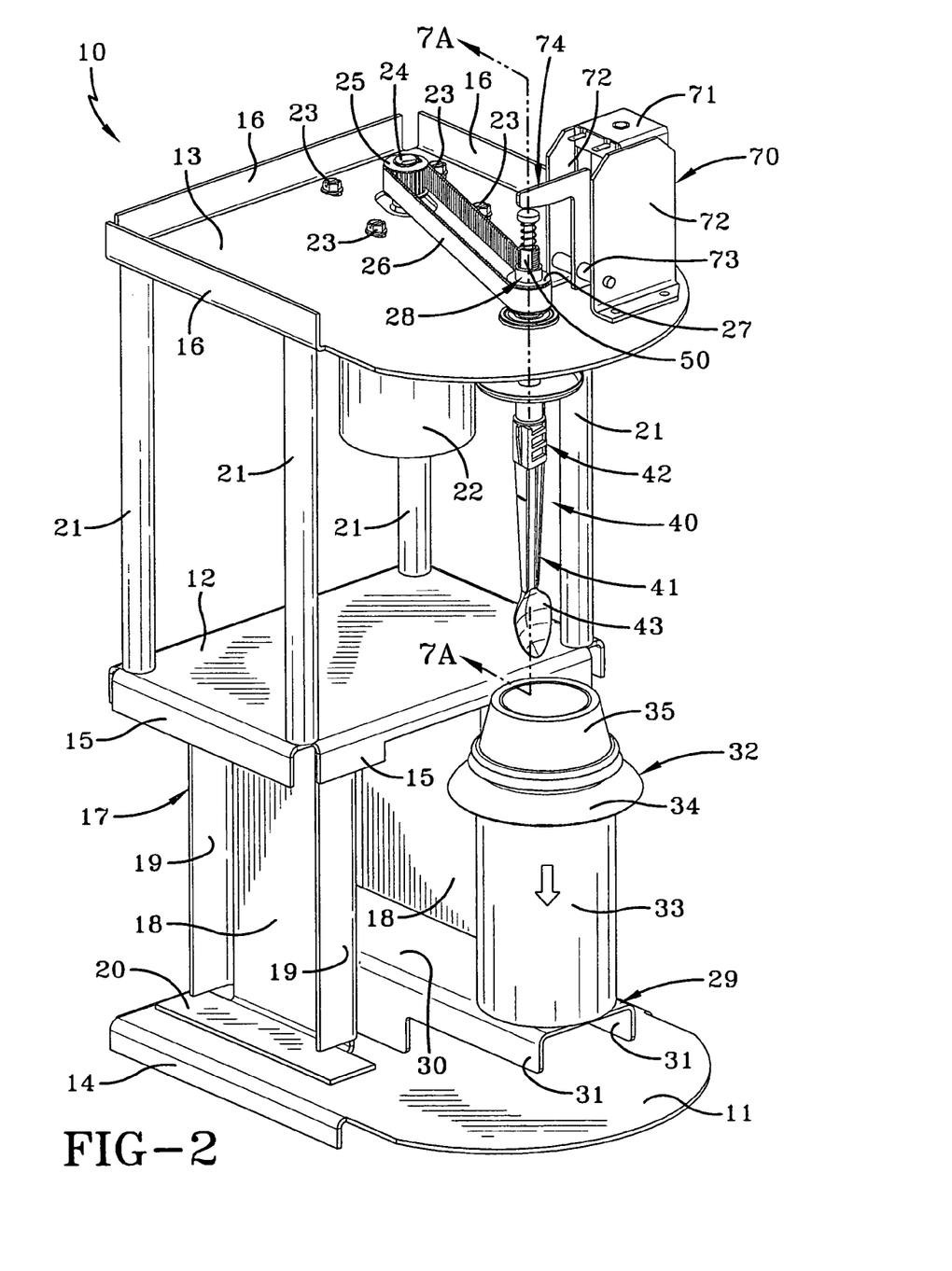
FIG. 2 is a perspective view like FIG. 1 but showing the agitator out of the cup.

Regarding those features of machine 10 shown herein, included are a bottom plate 11, an intermediate plate 12 and a top plate 13. Bottom plate 11 is provided with downwardly directed flanges 14 at the sides and rear thereof, intermediate plate 12 is provided with downwardly directed flanges 15 at the sides and rear thereof as well as partially along its front, and top plate is provided with upwardly directed flanges 16 at the sides and rear thereof. Flanges 14, 15 and 16 are adapted to receive and carry a housing (not shown) in a conventional fashion.

Intermediate plate 12 is carried spaced from bottom plate 11 by opposed box frames generally indicated by the numeral 17 and positioned on each side of machine 10. Each box frame 17 includes an upstanding plate 18, opposed side plates 19, and opposed top and bottom plates 20. Bottom plates 20 are attached to the top of machine bottom plate 11, and the top end plate (not shown) is attached to the bottom of intermediate plate 12. As such, box frames 17 support intermediate plate 12 spaced above bottom plate 11.

Top plate 13 is carried spaced from intermediate plate 12 by opposed posts 21 located between the corners of plates 12 and 13. As such, posts 21 support top plate 13 spaced above intermediate plate 12.

An agitator motor 22 is carried by top plate 13, as by bolts 23, and is thereby suspended between top plate 13 and intermediate plate 12. Motor 22 rotates a shaft 24 which carries a pulley 25. A belt 26 extends between pulley 25 and a pulley 27 carried by an agitator shaft assembly generally indicated by the numeral 28. Thus, through belt 26, motor 22 turns agitator shaft assembly 28 which extends through, and downwardly from, top plate 13.

Machine 10 also includes a travel plate generally indicated by the numeral 29. Travel plate 29 is generally u-shaped in configuration having a platform portion 30 and opposed branches 31 extending downwardly from the periphery of platform 30. A holder for a container such as a cup or the like is generally indicated by the numeral 32 and includes a cylindrical body portion 33. Body portion 33 is hollow so as to receive a food holding cup (not shown) and is surrounded at its upper periphery by an arcuate flange 34. A removable domed lid 35 may be provided at the top of holder 32 to reduce the possibility of the splashing of food out of the cup in which it is being mixed. As described in U.S. patent application Ser. No. 12/460,273, holder 32 may be rotated, if desired, by a motor (not shown) carried by travel plate 29, and travel plate 29 is moved upwardly and downwardly by a motor (not shown) which may be carried by intermediate plate 12.

Figure 3:
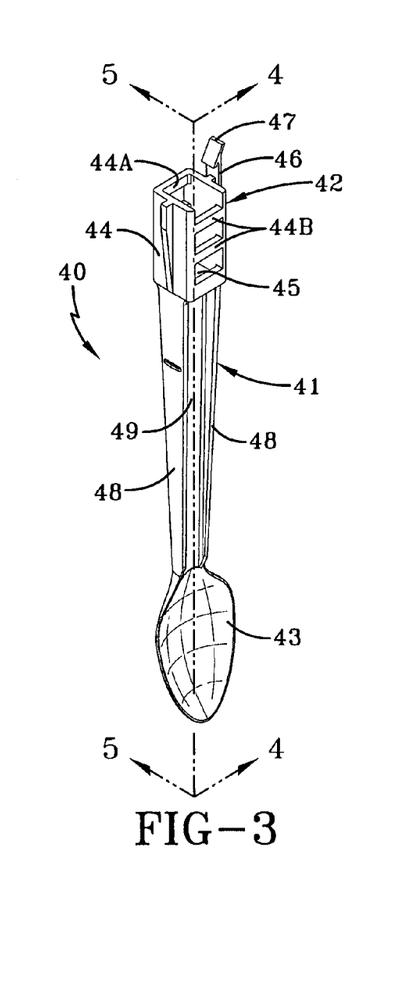
FIG. 3 is a perspective view of a disposable agitator being in the shape of a spoon.

Agitator shaft assembly 28, which is hollow throughout its length, carries an agitator, generally indicated by the numeral 40, which can take on any conventional shape but is shown as advantageously being in the shape of a spoon. As such, agitator 40 is preferably a plastic member having a stem portion, generally indicated by the numeral 41, a shaft coupler portion, generally indicated by the numeral 42 and formed at one end of stem 41, and a blade portion 43 which is in the shape of the bowl of a spoon formed at the other end of stem 41.

Figure 4:
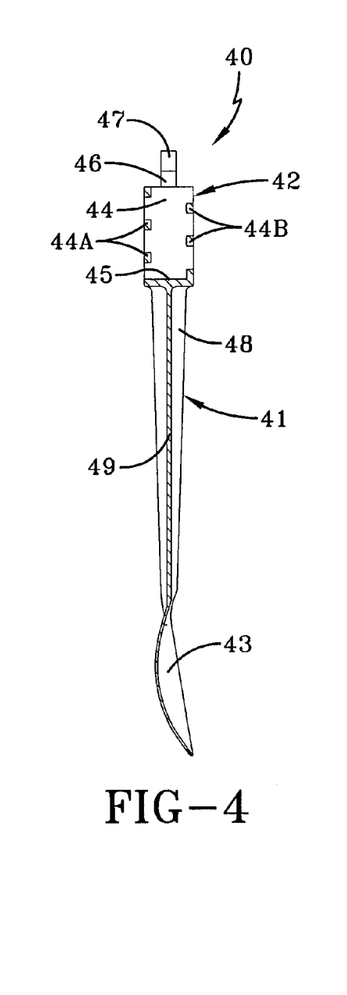
FIG. 4 is a sectional view taken substantially along line 4-4 of FIG. 3.
Figure 5:
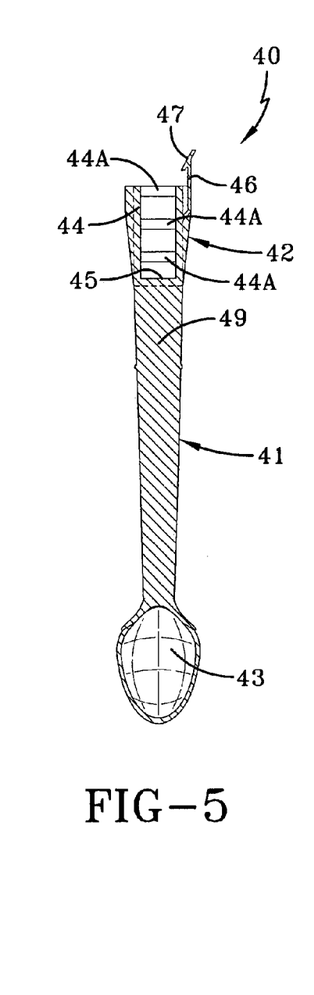
FIG. 5 is a sectional view taken substantially along line 5-5 of FIG. 3.

Coupler portion 42 of agitator 40 includes a generally rectangular hollow socket 44 having a bottom surface 45 and being open at the top. A flexible clip 46 extends upwardly from the socket 44 and carries a lock barb 47 positioned above the top of socket 44. The stem portion 41 of agitator 40 is in the shape of an I-beam and includes opposed side walls 48 spanned by a central wall 49. Walls 48 and 49 extend downwardly from bottom surface 45 of socket 44 to blade portion 43. This I-beam shape provides strength to spoon agitator 40 to resist potential torque and breakage if an extremely frozen material were to be mixed by blade portion 43.

Spoon agitator 40 is also easier to mold than prior art agitators which have been configured like a spoon. Because the stem portion 41 is not hollow, the long pull molding procedure is not required. Rather, the only hollow portion of the agitator, the socket 44, may be readily formed with bypassing shut offs. As shown in FIGS. 3-5, the opposed sides of hollow socket 44 are formed with slats 44A and 44B extending between the sides of socket 44. Slats 44A and 44B are vertically offset from each other as are the openings between adjacent slats 44A and 44B. The shape of socket 44 is thus molded by shut offs offset from each other in the openings between slots 44A and between slats 44B. The molding tool is thus opened in one motion and the long pull of the prior art is avoided.

Figure 6:
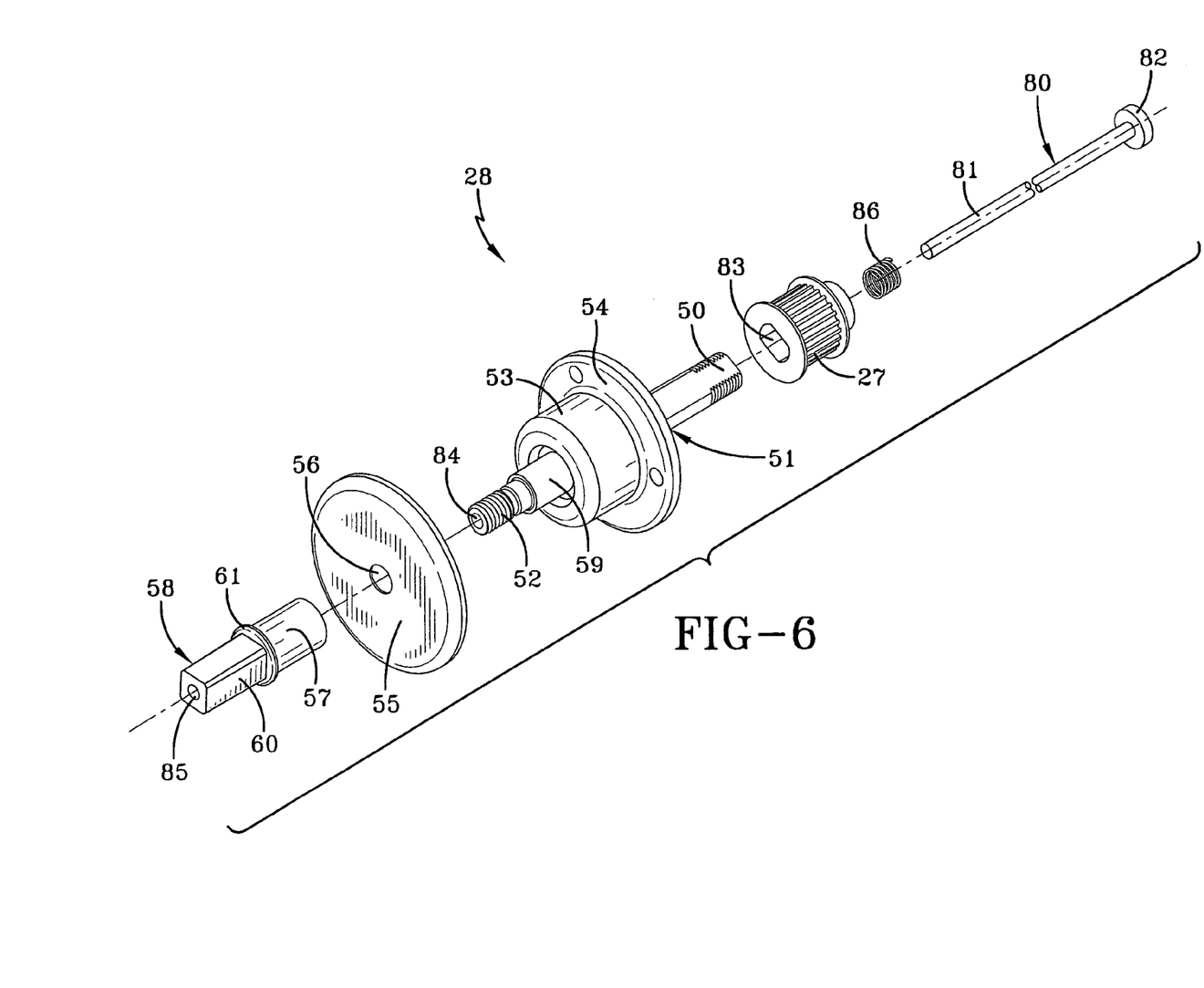
FIG. 6 is an exploded view of the rotatable shaft of the food mixing machine as well as some of its agitator releasing components.

The details of shaft assembly 28 are best shown in the exploded view, FIG. 6. One end 50 of a segment 51 of shaft assembly 28 is received in pulley 27 and is configured as a double D so that it will rotate with pulley 27. The other end of shaft segment 51 is threaded, as at 52. Shaft segment 51 extends through a bearing assembly 53 having a mounting flange 54 extending radically outwardly therefrom. Mounting flange 54 is attached to top plate 13 of machine 10. A slinger disk 55 may be provided to assure that food being mixed does not splash upwardly into the workings of shaft assembly 28, its motor 22 and the like. The threaded end 52 of shaft segment 51 extends through an opening 56 in slinger 55 and is received in an internally threaded tube portion 57 of an agitator driver generally indicated by the numeral 58. Slinger disk 55 is maintained in proper position along shaft segment 51 as it is sandwiched between tube 57 and a spacer 59 which positioned around shaft segment end 52 and which bears against the end of shaft segment 50 opposite to its end received in pulley 27. The end of shaft assembly 28 is defined by a square drive end 60 of agitator driver 58. A lock flange 61 is provided between drive end 60 and tube 57. Thus, shaft assembly 28 extends from end 50 of shaft segment 51 to drive end 60.

Figure 7A:
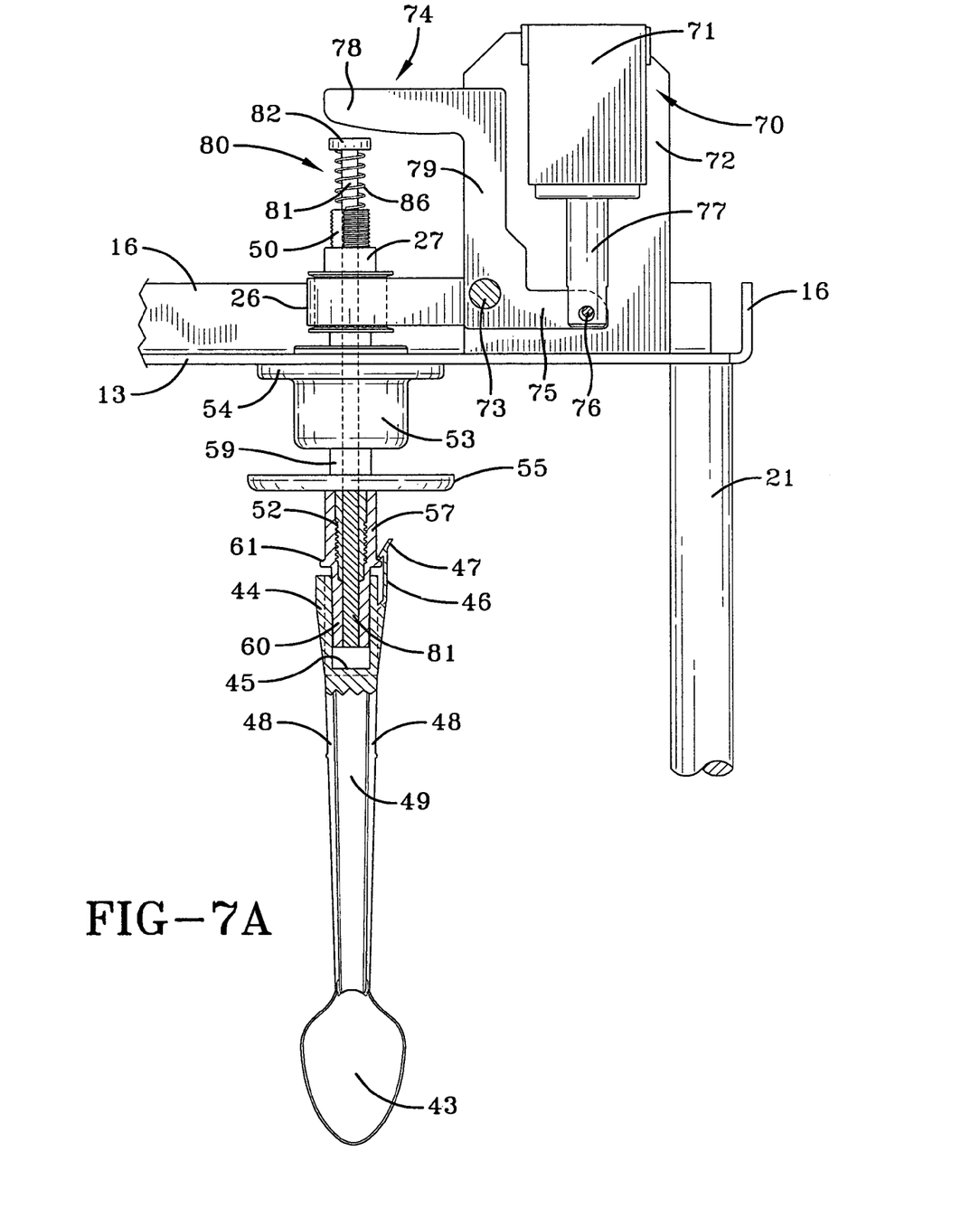
FIG. 7A is a fragmented sectional view taken substantially along line 7A-7A of FIG. 2.

To attach agitator 40 to shaft assembly 28, shaft drive end 60 is received in shaft coupler portion 42 of agitator 40. As the agitator 40 is being moved upwardly to accomplish such connection, clip 46 flexes until lock barb 47 snaps over lock flange 61 of agitator driver 58. As such, and as shown in FIG. 7A, shaft assembly 28 carries agitator 40.

Agitator 40 may be manually removed from shaft assembly 28 by merely pulling down on agitator 40. However, it has been found desirable, and it is an object of the present invention, to provide an automatic release of the agitator 40 from the shaft assembly 28. To that end, an agitator release assembly, generally indicated by the numeral 70, is provided.

Release assembly 70 includes an activation device shown to be in the form of a solenoid 71 carried between opposed bracket walls 72 which are mounted on top plate 13 of machine 10. However, any suitable activation device, such as a pneumatic or hydraulic cylinder, could be utilized without departing from the concept of the present invention. A pivot pin 73 extends between bracket walls 72 and carries a somewhat Z-shaped actuating arm generally indicated by the numeral 74. As best shown in FIG. 7A, arm 74 includes a normally horizontally positioned base 75 attached at one end to pin 73, and attached, as by a pin connection 76, to a plunger 77 of solenoid 71. Arm 74 also includes a normally horizontally positioned lever 78 which is connected to base 75 by a normally generally vertical portion 79 of arm 74 thereby forming the Z-shape. Lever 78 thus extends outwardly from between bracket walls 72.

Figure 7B:
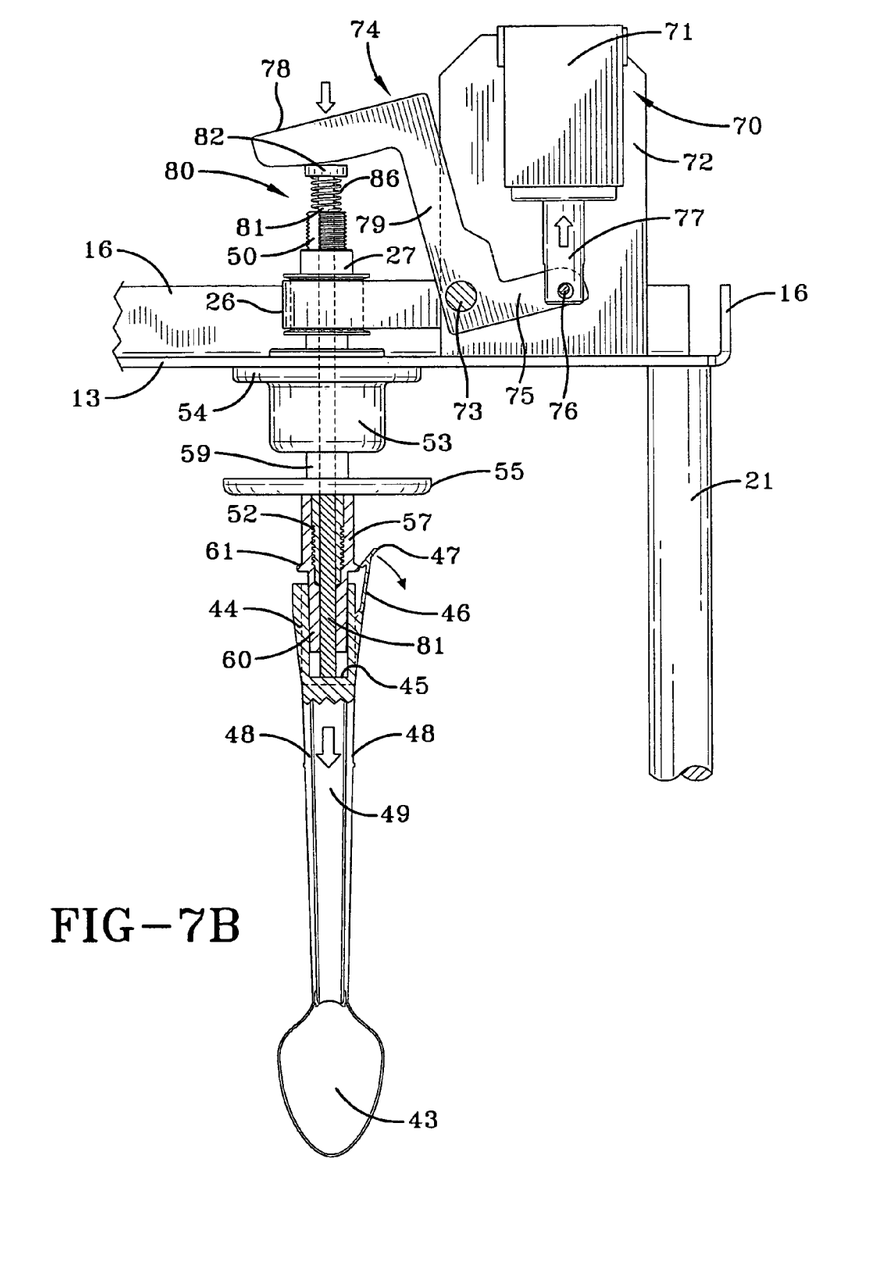
FIG. 7B is a fragmented sectional view like FIG. 7A sequentially following FIG. 7A and showing the agitator as it is being released.
Figure 7C:
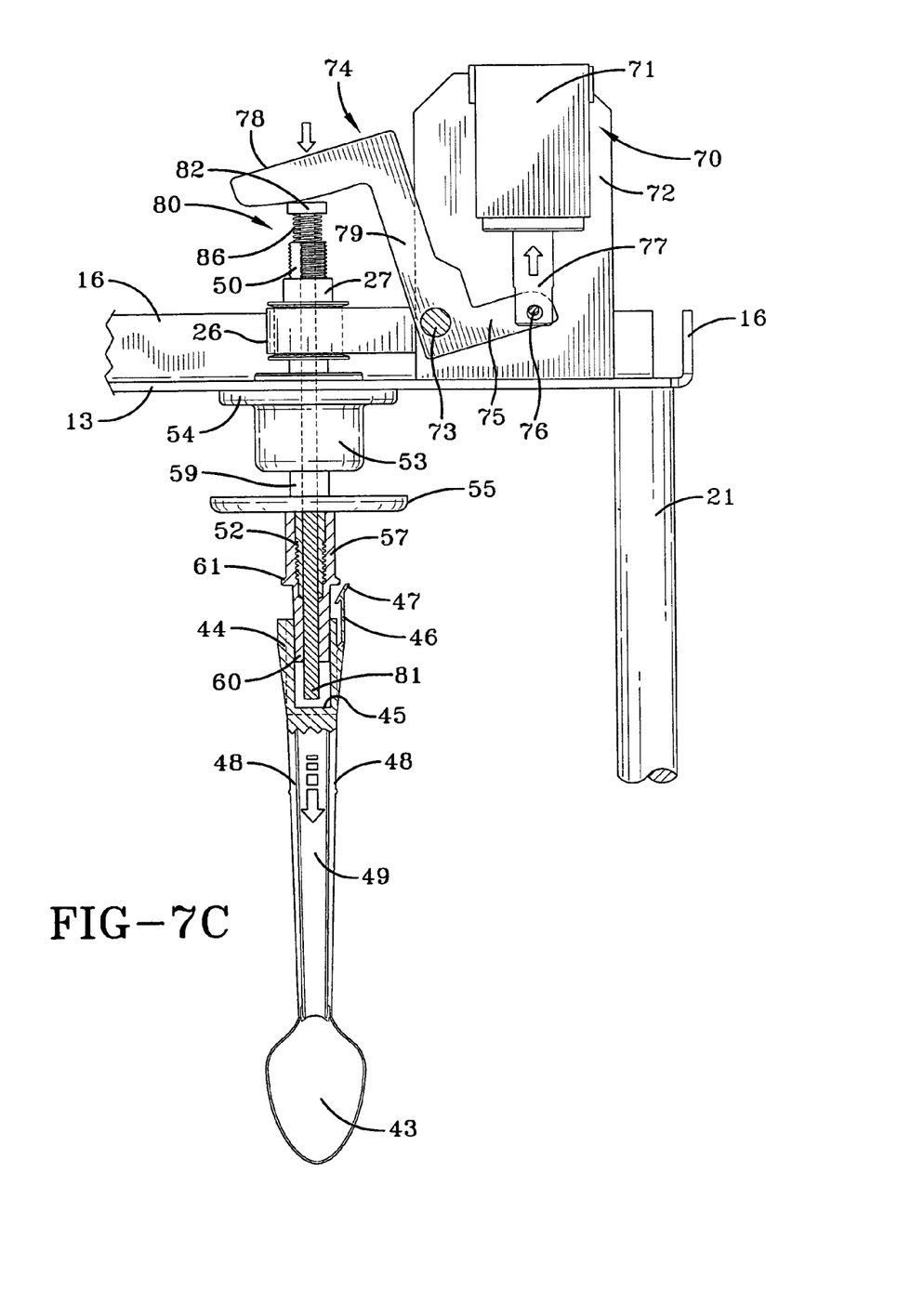
FIG. 7C is a fragmented sectional view like FIGS. 7A and 7B sequentially following FIG. 7B and showing the agitator fully released.

An agitator-ejecting plunger is generally indicated by the numeral 80 and is in the form of an elongate pin 81 having an enlarged head 82 at one end thereof. Pin 81 extends through an aperture 83 in pulley 27, an aperture 84 in shaft segment 51, and into an aperture 85 in agitator driver 58. As such, in its normal position with agitator 40 connected to driver 58 as shown in FIG. 7A, the bottom of pin 81 is just above the bottom surface 45 of agitator socket 44. At this time the head 82 of plunger 80 is positioned just below lever 78 of arm 74. Upon activation of solenoid 71, its plunger 77 moves upwardly as shown in FIGS. 7B and 7C thereby pivoting arm 74 on pin 73 at which time lever 78 engages head 82 of plunger 80 and overcomes the bias of a spring 86 positioned around pin 81 between head 82 and the end 50 of shaft segment 51. Such causes the bottom of pin 81 to move through driver 58 and engage the bottom surface 45 of agitator socket 44. Thus, as shown in FIG. 7B, clip 46 flexes until barb 47 passes over lock flange 61 of driver 58 and agitator 40 is thereby released as shown in FIG. 7C. When solenoid 71 is de-energized, arm 74 returns to the FIG. 7A position and spring 86 acts on plunger head 82 to return plunger 80 to its normal inactive position. It should also be noted that a solenoid could be positioned so as to directly act on plunger 80 thereby eliminating the need for actuating arm 74 if that would be desired in some instances. In addition, it is contemplated that the agitator 40 may be carried directly by the shaft of the motor 22 which would thus be mounted on top plate 13 directly above cup holder 32. In this instance, the shaft of motor 22 would be hollow to receive plunger pin 81, and solenoid 71 would be positioned on top of the motor 22 so as to be able to engage the plunger 80.

In all instances, solenoid 71 could be operated by the user of machine 10 at the appropriate time when agitator release was desired, as by pushing a button on the control panel of machine 10, or solenoid 71 could be automatically activated at the appropriate time at the end of a mixing cycle, for example, as shown in FIG. 2, or as the machine 10 was moving from the FIG. 2 to the FIG. 1 position.

In view of the foregoing, it should be evident that a machine 10, provided with a spoon agitator 40 and an agitator release assembly 70 constructed as described herein substantially improves the art and otherwise accomplishes the objects of the present invention.

What is claimed is:

1. A machine for mixing food products comprising a rotatable shaft assembly, an agitator carried by said shaft assembly and adapted to mix the food products, and means to release said agitator from said shaft assembly, said agitator being configured like a spoon having a shaft in the form of an I-beam with a blade configured as the bowl of a spoon positioned on one end of said shaft.

2. The machine of claim 1 wherein said agitator includes a socket and said shaft assembly includes a driver received in said socket.

3. The machine of claim 2 wherein said socket includes slats formed by shut offs during the molding process.

4. The machine of claim 2 wherein said driver includes a flange and said agitator includes means to engage said flange.

5. A machine for mixing food products comprising a rotatable shaft assembly, an agitator carried by said shaft assembly and adapted to mix the food products, and means to release said agitator from said shaft assembly, said agitator including a socket and said shaft assembly including a driver received in said socket, said driver including a flange and said agitator including means to engage said flange, said means to release including a pin moveable through said driver, said socket having a bottom surface engageable by said pin to release said means to engage said flange from said flange.

6. An agitator for a food mixing machine having a rotatable shaft comprising a stem in the shape of an I-beam, a blade of one end of said stem, said blade being in the shape of a bowl of a spoon, and a shaft coupler on the other end of said stem, said shaft coupler adapted to receive the rotating shaft of the mixing machine.

7. The agitator of claim 6, said shaft coupler including a socket, said socket having a bottom surface, and opposed sides having slats formed by shut offs during the molding process.

8. The agitator of claim 7, wherein said slats on one side of said socket are vertically offset from said slats on the opposed side of said socket.

9. An agitator for a food mixing machine having a rotatable shaft comprising a stem in the shape of an I-beam, a blade of one end of said stem, said blade being in the shape of a bowl of a spoon, and a shaft coupler on the other end of said stem, said shaft coupler adapted to receive the rotating shaft of the mixing machine, wherein said shaft coupler includes a clip adapted to engage the rotating shaft of the mixing machine.

10. The agitator of claim 9 wherein said shaft coupler includes a surface used to release said clip from the rotating shaft.

11. An agitator for a food mixing machine having a rotating shaft comprising a stem, a blade at one end of said stem, said blade being in the shape of a bowl of a spoon, a socket on the other end of said stem, said socket being adapted to receive the rotating shaft of the mixing machine and having a bottom surface and opposed sides haying slats formed by shut offs during the molding process.

12. The agitator of claim 11 wherein said stem is in the shape of an I-beam.

13. Thh agitator of claim 11, wherein said slats on one side of said socket are vertically offset from said slats on the opposed side of said socket.

14. The agitator of claim 11 wherein said socket includes a clip adapted to engage the rotating shaft of the mixing machine.

15. The agitator of claim 14 wherein said bottom surface is used to release said clip from the rotating shaft.

16. A machine for mixing food products comprising a rotatable shaft assembly; an agitator carried by said rotatable shaft assembly; said agitator having a stem in the form of an I-beam, a blade in the shape of the bowl of a spoon at one end of said stem adapted to mix the food products, and a socket at the other end of said stem, said socket being adapted to receive said rotatable shaft assembly; and means to release said agitator from said rotatable shaft assembly.

17. The machine of claim 16 wherein said socket includes a clip engaging said rotatable shaft assembly.

18. The machine of claim 17 wherein said socket includes a bottom surface, said means to release engaging said bottom surface to release said clip from said rotatable shaft assembly.

\* \* \* \* \*